(12) United States Patent
Salter et al.

(10) Patent No.: US 9,605,471 B2
(45) Date of Patent: Mar. 28, 2017

(54) METHOD AND SYSTEM FOR CONTROLLING VEHICLE REAR DOOR

(71) Applicant: Ford Global Technologies, LLC, Dearborn, MI (US)

(72) Inventors: Stuart C. Salter, White Lake, MI (US); Terry Lobsinger, Farmington Hills, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/825,603

(22) Filed: Aug. 13, 2015

(65) Prior Publication Data
US 2017/0044816 A1    Feb. 16, 2017

(51) Int. Cl.
*B60J 5/10*    (2006.01)
*E05F 15/00*    (2015.01)
*E05F 15/73*    (2015.01)

(52) U.S. Cl.
CPC ............ *E05F 15/73* (2015.01); *B60J 5/101* (2013.01); *E05Y 2900/532* (2013.01)

(58) Field of Classification Search
CPC ..... E05F 15/73; B60J 5/101; E05Y 2900/532; B60R 25/00; B60R 25/245
See application file for complete search history.

(56) References Cited

U.S. PATENT DOCUMENTS

| | | | | | |
|---|---|---|---|---|---|
| 2,530,364 | A | * | 11/1950 | Woodward | H01H 13/183 200/534 |
| 2,779,833 | A | * | 1/1957 | Farison | H01H 13/183 200/296 |
| 5,973,611 | A | * | 10/1999 | Kulha | B60R 25/245 307/10.1 |
| 6,583,715 | B1 | * | 6/2003 | Benzie | G07C 9/00182 340/5.62 |

(Continued)

FOREIGN PATENT DOCUMENTS

| | | |
|---|---|---|
| DE | 102007041288 A1 | 3/2009 |
| JP | 04182589 A * | 6/1992 |

(Continued)

OTHER PUBLICATIONS

JPO machine translation of JP 2014-009470 (original JP document published Jan. 20, 2014).*

(Continued)

*Primary Examiner* — Behrang Badii
*Assistant Examiner* — David Testardi
(74) *Attorney, Agent, or Firm* — Jason Rogers; Price Heneveld LLP (57) ABSTRACT

A vehicle rear door control system and method of controlling a vehicle rear door, such as a hatch or trunk is provided. The method detects the opening of a side door of a vehicle and senses with a plurality of proximity sensors movement of an object such as a driver or passenger of the vehicle exiting the vehicle and moving from a side to a rear of the vehicle. The method controls an actuator to open the rear (Continued)

door of the vehicle in response to the detected opening of the side door followed by the sensed movement of the driver or passenger from the side to the rear of the vehicle.

20 Claims, 5 Drawing Sheets (56) References Cited

U.S. PATENT DOCUMENTS

| | | | |
|---|---|---|---|
| 6,700,475 B1* | 3/2004 | Geber | G07C 9/00309 307/10.1 |
| 7,378,641 B2 | 5/2008 | Melcher et al. | |
| 8,091,280 B2 | 1/2012 | Hanzel et al. | |
| 8,882,174 B2 | 11/2014 | Wechs | |
| 2001/0054952 A1* | 12/2001 | Desai | E05B 77/48 340/5.72 |
| 2005/0168322 A1* | 8/2005 | Appenrodt | B60R 25/246 340/5.72 |
| 2007/0146120 A1* | 6/2007 | Kachouh | B60R 25/245 340/5.72 |
| 2008/0106367 A1* | 5/2008 | Kachouh | B60R 25/245 340/5.2 |
| 2008/0129446 A1* | 6/2008 | Vader | B60R 25/24 340/5.6 |
| 2009/0030579 A1* | 1/2009 | Takehisa | E05F 15/76 701/49 |
| 2009/0085720 A1* | 4/2009 | Kurpinski | B60R 25/246 340/5.64 |
| 2009/0096575 A1* | 4/2009 | Tieman | G07C 9/00309 340/5.62 |
| 2010/0152966 A1* | 6/2010 | Tessier | B60R 25/245 701/36 |
| 2010/0289506 A1* | 11/2010 | Moon | H03K 17/955 324/681 |
| 2010/0325960 A1* | 12/2010 | McEwan | B60J 1/17 49/31 |
| 2013/0099892 A1* | 4/2013 | Tucker | G07C 9/00309 340/5.61 |
| 2013/0249669 A1* | 9/2013 | Zwiener | B60R 25/2045 340/5.53 |
| 2013/0271202 A1* | 10/2013 | Buttolo | H03K 17/955 327/517 |
| 2013/0332007 A1* | 12/2013 | Louboutin | H04W 4/021 701/2 |
| 2014/0156112 A1 | 6/2014 | Lee | |
| 2014/0176301 A1* | 6/2014 | Fernandez Banares | G07C 9/00015 340/5.26 |
| 2014/0253287 A1* | 9/2014 | Bauman | G07C 9/00309 340/5.61 |
| 2015/0009062 A1 | 1/2015 | Herthan | |
| 2015/0012176 A1 | 1/2015 | Schindler et al. | |
| 2015/0019046 A1* | 1/2015 | Jang | E05F 15/2076 701/2 |
| 2015/0300074 A1* | 10/2015 | Ette | B60R 25/245 701/2 |
| 2016/0001742 A1* | 1/2016 | Miyazawa | B60R 25/245 701/2 |
| 2016/0083995 A1* | 3/2016 | Dezorzi | E05F 15/73 340/5.72 |
| 2016/0251890 A1* | 9/2016 | Sakai | E05F 15/77 340/5.72 |

FOREIGN PATENT DOCUMENTS

| | | | |
|---|---|---|---|
| JP | 2005307692 A | * | 11/2005 |
| JP | 2006213206 A | * | 8/2006 |
| JP | 2006225953 A | * | 8/2006 |
| JP | 2007277867 A | * | 10/2007 |
| JP | 2008121254 A | * | 5/2008 |
| JP | 2014009470 A | | 1/2014 |
| JP | 2014221982 A | * | 11/2014 |
| JP | 2016135959 A | * | 7/2016 |
| KR | 20140023538 | | 2/2014 |
| KR | 20140062773 | | 5/2014 |
| KR | 20140070708 | | 6/2014 |
| WO | 2010139439 A1 | | 12/2010 |
| WO | 2012034784 A1 | | 3/2012 |
| WO | 2014033299 A1 | | 3/2014 |
| WO | 2014064297 A1 | | 5/2014 |

OTHER PUBLICATIONS

JPO machine translation of JP 2006-225953 (original JP document published Aug. 31, 2006).*
JPO machine translation of JP 2006-213206 (original JP document published Aug. 17, 2006).*
JPO machine translation of JP 04-182589 (original JP document published Jun. 30, 1992).*
"Orgacon EL-P3000, Screen printing Ink Series 3000," 2 pages, AGFA, last updated in Feb. 2006.
"Touch Sensors Design Guide" by ATMEL, 10620 D-AT42-04/09, Revised Apr. 2009, 72 pages, Copyrighted 2008-2009 Atmel Corporation.

* cited by examiner

METHOD AND SYSTEM FOR CONTROLLING VEHICLE REAR DOOR

FIELD OF THE INVENTION

The present invention generally relates to controlling operation of a vehicle rear door such as a hatch or trunk and, more particularly relates to opening the rear door based on proximity sensing.

BACKGROUND OF THE INVENTION

Automotive vehicles typically include a rear door generally in the form of a hatch or trunk which closes to contain a rear storage compartment and opens to allow access to the compartment from the rear side of the vehicle. The rear door typically pivots between a closed position and an open position. Some rear hatches may include a motor or other actuator to actuate the hatch between the open and closed positions. Other rear doors such as a trunk of a vehicle may include an actuatable release mechanism to allow the trunk to open. Typically, the user, such as a driver of the vehicle is required to actuate a latch manually or via a switch (e.g., key fob) or a sensor to activate opening and closing of the hatch. It is desirable to provide for a rear door opening that minimizes the user interaction to activate the door.

SUMMARY OF THE INVENTION

According to one aspect of the present invention, a method of controlling a vehicle rear door is provided. The method includes the steps of detecting opening of a side door of a vehicle, sensing with a plurality of proximity sensors movement of a person moving from a side to a rear of the vehicle, and controlling an actuator to open the rear door of the vehicle in response to the detected opening of the side door followed by the sensed movement of the person.

According to another aspect of the present invention, a control system for a rear door of a vehicle is provided. The control system includes an actuator operatively coupled to the rear door of the vehicle and a plurality of proximity sensors disposed on a side and rear of the vehicle for detecting movement of a person from the side to the rear of the vehicle. The control system also includes a controller controlling the actuator to open the rear door when the movement of the person from the side to the rear is detected.

According to a further aspect of the present invention, a vehicle is provided. The vehicle includes a rear door, a side door, a door sensor for detecting an open state of the side door, and an actuator for actuating the rear door. The vehicle also includes a plurality of proximity sensors disposed on a side and rear of the vehicle for detecting movement of a person from the side to the rear of the vehicle after the detected open state of the side door. The vehicle further includes a controller controlling the actuator to open the rear door wherein the movement of the person from the side to the rear is detected.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
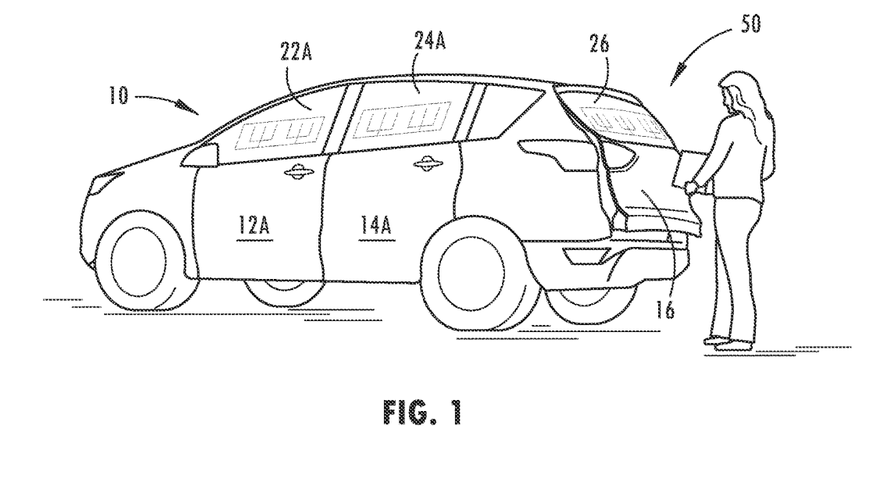
FIG. 1 is a perspective view of an automotive vehicle having a rear door control system, according to one embodiment.
Figure 2:
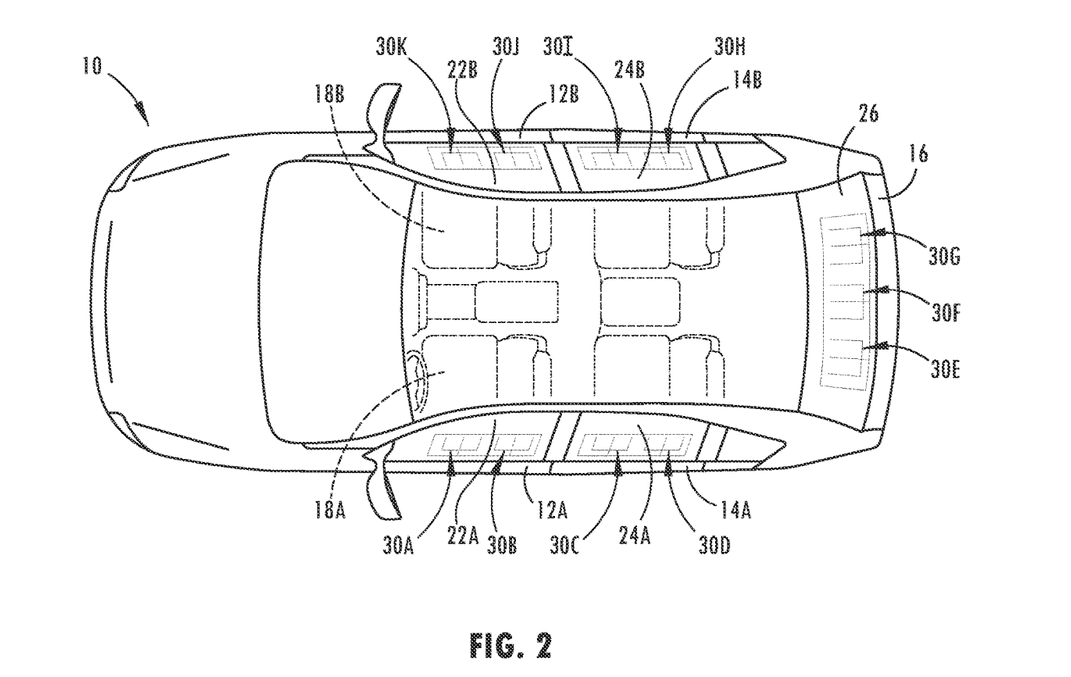
FIG. 2 is a top view of the vehicle further illustrating various proximity sensors located in the windows employed in the control system.
Figure 3:
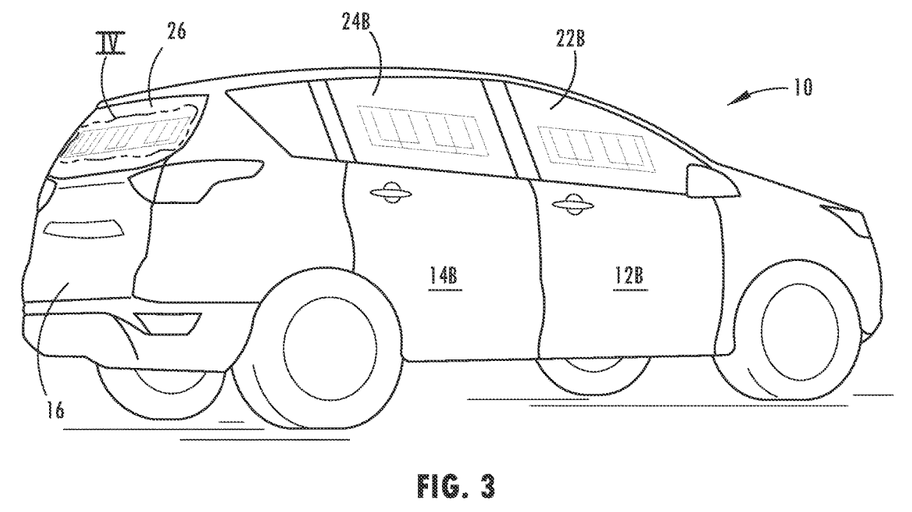
FIG. 3 is a side perspective view of the vehicle further illustrating the proximity sensors located in the windows.

Referring to FIGS. 1-3, an automotive wheeled vehicle 10 is generally illustrated having a rear door 16 that opens and closes and a control system 50 for controlling the rear door 16 to automatically open and close pursuant to sensed conditions and a control routine. The vehicle 10 generally has a passenger compartment having vehicle seats configured to seat a driver and one or more passengers. The vehicle 10 has a driver side seat 18A located forward of the steering wheel and a front passenger seat 18B on the opposite side as well as rear passenger seats located rearward of the front seats. The vehicle 10 is shown having front side doors 12A and 12B and rear side doors 14A and 14B on opposite lateral sides of the vehicle 10. Lateral side door 12A pivots between open and closed positions to allow the driver of the vehicle to enter and exit the vehicle 10. Lateral side door 12B pivots between open and closed positions to allow a passenger on the side opposite the driver's side to enter and exit the vehicle 10. The rear side doors 14A and 14B likewise pivot between open and closed positions to allow passengers seated in the rear seating area of the vehicle to enter and exit the vehicle 10. Each of the side doors 12A, 12B, 14A and 14B is shown having one or more windows, each window having a transparent pane generally in the form of glass to allow unobstructed viewing through the window. The front driver's door 12A is shown having a window 22A, while the front passenger side door 12B is shown having a window 22B. Rear side door 14A has window 24A and the opposite rear side door 14B has a window 24B. It should be appreciated that the vehicle may be equipped with more or less doors and more or less windows and that additional windows may be provided rearward of the rear side doors 14A and 14B.

The rear door 16 of the vehicle 10 may be in the form of a hatch such as is common for a van or SUV or other hatchback vehicle, according to one embodiment. According to another embodiment, the rear door 16 may be in the form of a trunk for a sedan-type vehicle. The rear door 16 has at least one rear window 26 for allowing viewing rearward of the vehicle 10. The rear door 16 generally pivots between an open position which allows access to the interior of the vehicle at the rear end and a closed position. The rear door 16 has an actuator that is actuatable to open the rear door 16. According to one embodiment, the actuator may include a motor (e.g., electric DC motor) that is powered to move the door 16 between the open and closed positions. According to another embodiment, the actuator may include a latch mechanism that is releasable to unlatch a vehicle door, such as a trunk, from its closed position and allow the trunk to open to the open position such as with a bias spring. For vehicles equipped with a tailgate, it is conceivable that the tailgate may be a rear door. It should be appreciated that with the use of a motor, the rear door 16 may both open and close with the use of the motor.

The vehicle 10 is equipped with a rear door control system that controls actuation of the rear door to allow the door to automatically open when a driver or passenger of the vehicle 10 exits a side door of the vehicle and moves to the rear end of the vehicle 10, according to a control routine. The control system 50 includes a plurality of proximity sensors located on the sides and rear of the vehicle 10 to sense movement of the driver or passenger moving from a side of the vehicle to a position at the rear end of the vehicle. The proximity sensors include proximity sensors 30A-30K shown located on the various windows 22A, 22B, 24A, 24B and 26 of the vehicle. In the embodiment shown, the front driver side door window 22A includes first and second proximity sensors 30A and 30B located side-by-side one forward of the other. Similarly, the rear driver side door window 24A includes third and fourth proximity sensors 30C and 30D likewise located side-by-side one forward of the other. The rear door window 26 is shown having three proximity sensors 30E-30G arranged side-by-side such that proximity sensor 30F is in the center of the rear window 26 and sensors 30E and 30G are located towards the opposite sides of the rear window 26. Additionally, the rear passenger side door window 24B has proximity sensors 30H and 30I located side-by-side, whereas the front passenger side window 22B has proximity sensors 30J and 30K located side-by-side. It should be appreciated that the proximity sensors may be located on various other portions of the windows or on other windows on the vehicle 10 extending along the side and rear of the vehicle which allow the sensing of an object, such as a driver or passenger of the vehicle, moving from a forward position on the side of the vehicle towards a rear position at the rear end of the vehicle generally rearward of the rear door 16. For vehicles equipped with additional side windows located rearward on the rear side doors 14A and 14B, the additional side windows may include one or more proximity sensors. It is preferred that the proximity sensors are located and spaced to allow continuous sensing of the driver or passenger as the person moves from the side to the rear of the vehicle 10.

The proximity sensors 30A-30K may be capacitive sensors, according to one embodiment. Each proximity sensor 32 provides a sense activation field to sense close proximity of an object such as a person (e.g., driver or passenger) in relation to the proximity sensors. In this embodiment, the sense activation field of each proximity sensor is a capacitive field and the body of a person has electrical conductivity and dielectric properties that cause a change or disturbance in the sense activation field, as should be evident to those skilled in the art. However, it should be appreciated by those skilled in the art that additional or alternative types of proximity sensors can be employed to sense an object in close proximity, such as, but not limited to, inductive sensors, optical sensors, temperature sensors, resistive sensors, ultrasonic sensors, lasers, field effect sensors, the like, or a combination thereof. Exemplary proximity sensors are described in the Apr. 9, 2009 ATMEL® Touch Sensors Design Guide, 10620 D-AT42-04/09, the entire reference hereby being incorporated herein by reference.

Figure 4:
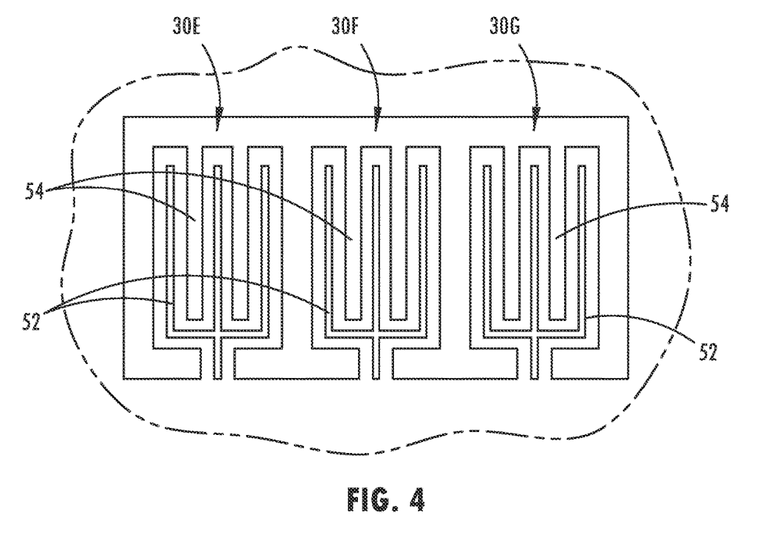
FIG. 4 is an enlarged view of the rear window mounted proximity sensors employed in the control system.

One arrangement of proximity sensors in the form of capacitive sensors located within one of the windows, such as the rear window 26, is illustrated in FIG. 4. In this example, the three rear proximity sensors 30E-30G are shown arranged side-by-side each having a pair of electrodes. The electrodes may include a drive electrode 52 for transmitting a signal and a receive electrode 54 for receiving a signal. The electrodes 52 and 54 are generally formed of a transparent conductive material that allows the capacitive sensor to be generally invisible to a person. Hence, the transparent proximity sensors do not obstruct the view through the window. The drive electrode 52 and receive electrode 54 each have interdigitated fingers for generating a capacitive field. The drive electrode 52 may receive square wave drive signal pulses applied at a voltage $V_I$, and the receive electrode 54 has an output for generating an output voltage $V_O$. It should be appreciated that the electrodes 52 and 54 may be arranged in various other configurations for generating the capacitive field as the activation field. The drive electrode 52 of each proximity sensor may be applied with the voltage input $V_I$ as square wave signal pulses having a charge pulse cycle at a clock speed of 96 megahertz sufficient to charge the receive electrode 54 to a desired voltage and achieve a desired sensitivity. The receive electrode 54 thereby serves as a measurement electrode. When a person, such as a driver or passenger enters the activation field, each of the proximity sensors in close proximity thereto detects a disturbance caused by the person to the corresponding activation field and determines whether the disturbance is sufficient to detect proximity of the person within a distance such as three (3) feet or more. The disturbance of the activation field is detected by processing the charge pulse signal associated with the corresponding signal channel for each proximity sensor. Each proximity sensor may have its own dedicated signal channel generating charge pulse counts which are processed by a controller.

The capacitive sensors may employ indium tin oxide as the clear transparent conductor according to one embodiment. The capacitive sensors may also employ a transparent conductive ink which may include a commercially available off the shelf conductive ink, such as EL-P ink sold under the brand name Orgacon™, such as EL-P 3000, which is made commercially available by AGFA, according to one example. Orgacon™ EL-P ink is a highly transparent, screen printable conductive ink, based on conductive polymers. The ink includes conductive polymers and a thermoplastic polymer binder. The liquid conductive ink may be applied directly to the glass windows in a desired pattern or may be formed onto a film which, in turn, is then applied and adhered onto the window. In any event, the transparent ink forming the capacitive sensors is formed onto the window and is visibly transparent to a user. It should be appreciated that the proximity sensors 30A-30K are formed on their respective windows of the vehicle 10 using a visibly transparent material. As a result, passengers inside the vehicle have an unobstructed view through the window and the proximity sensors are unobstructed by metal or other potential interfering material that would prevent or degrade the sensing of an object such as a person moving outside the vehicle 10 and in close proximity to the sensors. It should be appreciated that side window mounted proximity sensors 30A-30D and 30H-30K may be formed in the corresponding windows similar to the formation of the rear proximity sensors 30E-30G on rear window 26. While the three proximity sensors 30E-30G are shown located in the rear window of the rear door 16, it should be appreciated that the proximity sensors 30E-30G could otherwise be provided elsewhere in the rear door 16 or vehicle body, such as within the composite deck lid of the vehicle, according to other embodiments.

Figure 5:
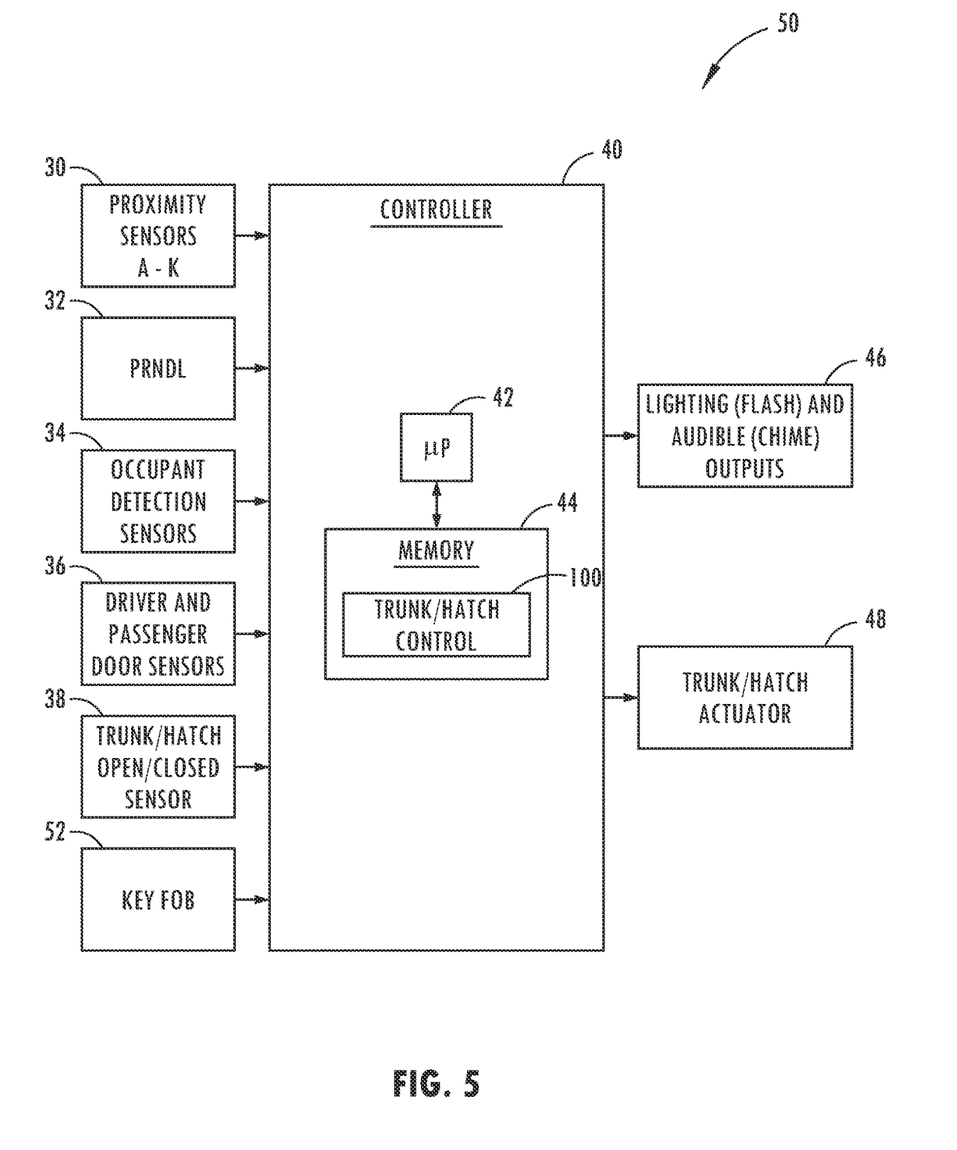
FIG. 5 is a block diagram further illustrating the vehicle rear door control system.

Referring to FIG. 5, the rear door control system 50 is further illustrated having control circuitry shown in one embodiment as a controller 40 including a microprocessor 42 and memory 44. The controller 40 may include other or additional analog and/or digital circuitry. Stored within memory is a control routine 100 that receives various inputs, such as sensed outputs from the sensors and provides control outputs for controlling actuation of the rear door 16. Inputs to the controller 40 include the vehicle transmission position signal (PRNDL) 32 which indicates when the vehicle is in park (P) and hence the vehicle is not moving, and occupant detection sensors for detecting one or more occupants in the vehicle. The occupant detection sensors 34 may include one or more seat weight sensors, ultrasonic sensors, or other sensors for detecting occupant presence within the vehicle seating area. Other inputs to the controller 40 include the driver and passenger door sensors 36 providing signals indicative of the open or closed state of the side doors of the vehicle, and a trunk/hatch open/closed sensor 38 providing a signal indicative of the open or closed state of the rear door 16 of the vehicle 10. Further, the controller 40 receives as inputs sensed proximity signals output from each of the proximity sensors 30A-30K. The controller 40 executes the trunk/hatch control routine 100 based on the various inputs and generates outputs to a trunk/hatch actuator 48 to control actuation of the rear door between the open and closed positions. Additionally, the controller 40 provides an output to lighting and audible outputs 46 such as to provide a visual light flash and/or audible chime sound.

The rear door control system 50 may further utilize the vehicle key fob 52 which is further shown as an input to the controller 40. The vehicle key fob 52 is presumed to be in the possession of the drive and hence, when detected, the driver is presumed to be the person approaching or exiting the vehicle in certain circumstances. For example, the driver of the vehicle may be detected by the presence of the key fob as the driver approaches the vehicle and may, in certain circumstances, be detected by the proximity sensors and cause activation of the rear door 16 to open the rear door 16. Contrarily, the driver of the vehicle may be detected departing from the vehicle with the key fob and the control system may automatically close the rear door 16 in certain circumstances. With the use of the key fob 52 as shown and described herein, according to another embodiment, it should be appreciated that the control system may operate without the processing the key fob signal.

Figure 6:
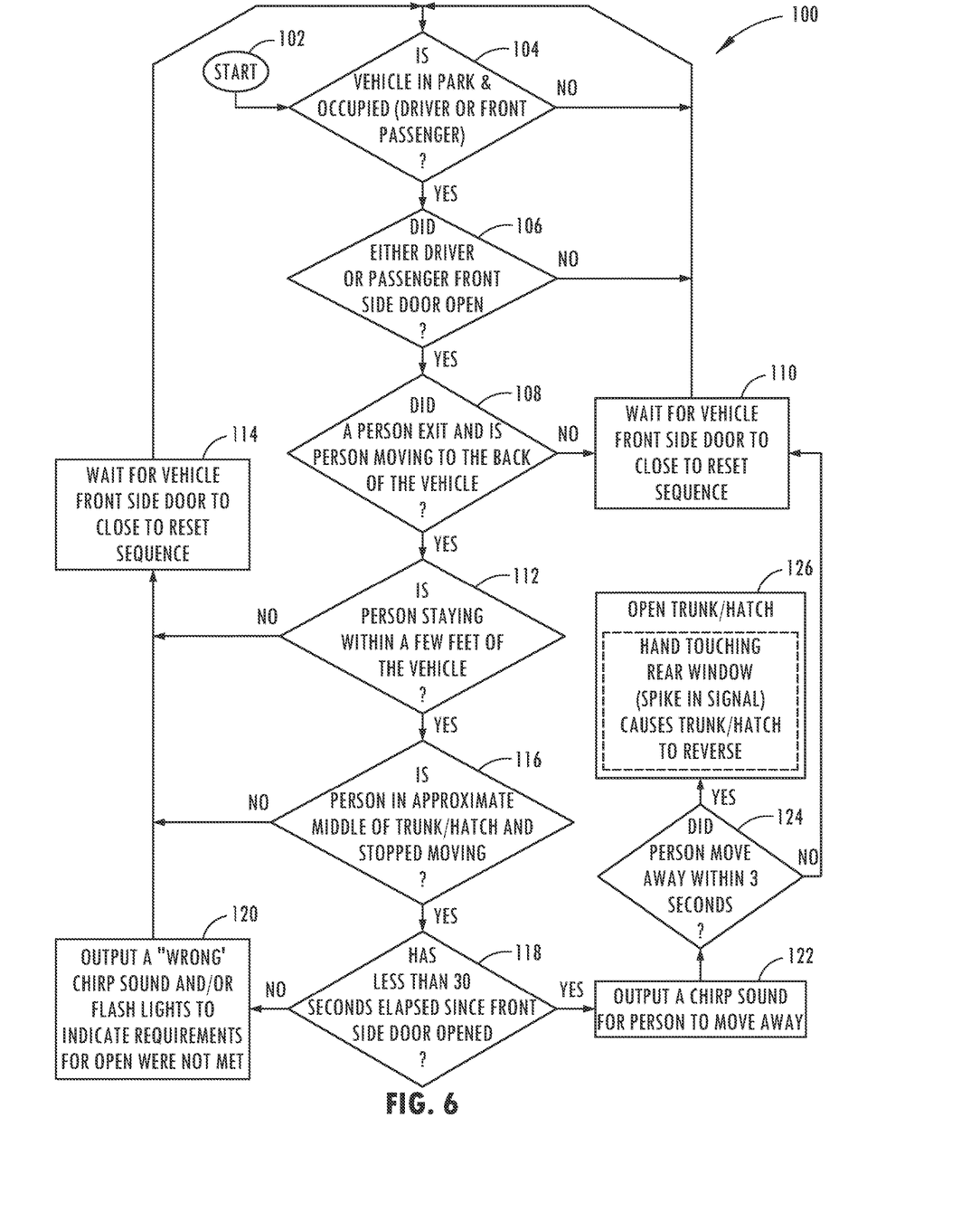
FIG. 6 is a flow diagram illustrating a control routine for the vehicle rear door control system.

Referring to FIG. 6, the control routine 100 is illustrated, according to one embodiment. The control routine 100 starts at step 102 and proceeds to decision step 104 to determine if the vehicle is in park and is occupied by a person, such as by a driver or front passenger. If the vehicle is not in park or the vehicle is not occupied by a person, routine 100 returns to step 104 and waits for the conditions of the vehicle in park and occupied by a person to be met. Otherwise, if the vehicle is in park and occupied by a person, routine 100 proceeds to decision step 106 to determine if either the driver or passenger front side door is open. If neither of the front side doors are open, routine 100 returns to step 104 and waits for the conditions of steps 102 and 104 to be met. Otherwise, if either the driver side or passenger side door is open, routine 100 proceeds to decision step 108 to determine if a person such as a driver or front seated passenger has exited the vehicle and if the person is moving rearward toward the back of the vehicle. A person may be detected exiting the vehicle by sensing an occupant departing the seating area with one or more occupant detection sensors and detecting an occupant stepping outside of the vehicle by detecting the occupant with the front door proximity sensors 30A and 30B or 30J and 30K with the corresponding side door in the open position. It should be appreciated that the proximity sensors 30A and 30B or 30J and 30K may detect the occupant in close proximity to the drive front side door or passenger front side door as the door is opened. This is possible because the proximity sensor signals transmit unobstructively in both the inside and outside directions of the glass window. Movement of the person toward the back of the vehicle can be detected by sensing proximity of the person in close relation to the proximity sensors sequentially progressing rearward of the front door, such as the rear side door mounted proximity sensors 30C and 30D or 30H and 30I. By employing a plurality of proximity sensors, movement from a forward position of the vehicle along the outer side of the vehicle towards a rearward position may be sensed by detecting the person in relation to the series of proximity sensors in a sequential manner. Further, the movement of the person towards and at the rear of the vehicle can be detected by the rear proximity sensors 30E-30G located in the rear window 26. If the person has not exited the vehicle and if the person is not moving toward the back of the vehicle, routine 100 proceeds to step 110 to wait for the vehicle front side door to close to reset the sequence at step 110 and returns to step 104.

If a person is detected exiting the vehicle and then moving toward the back of the vehicle, routine 100 proceeds to step 112 to determine if the person is staying within a few feet (e.g., three feet) of the vehicle. A person may be detected at a location within a few feet of the vehicle by the use of the proximity sensors detecting a signal of a sufficient amplitude as the person progresses toward the back of the vehicle. If the person deviates beyond a few feet of the vehicle while moving towards the rear of the vehicle, routine 100 proceeds to step 114 to wait for the vehicle front side door to close and to reset the sequence before returning to step 104. If the person stays within a few feet of the vehicle, routine 100 proceeds to decision step 116 to determine if the person has reached the approximate middle of the trunk/hatch at the rear end of the vehicle and has stopped moving for a predetermined time period such as one (1) second. The position of the person in the approximate middle of the trunk/hatch may be detected by the rear proximity sensors 30E-30G sensing an object in close proximity thereto. The stopped movement of the person at the rear middle of the vehicle may be detected by detecting a substantially constant signal with the rear middle proximity sensor 30F. If neither of the conditions of step 116 are met, routine 100 proceeds to step 114 to wait for the vehicle front side door to close and reset the sequence before returning to step 104. If the person is detected in the approximate middle of the trunk/hatch and the person has stopped moving, routine 100 proceeds to step 118 to determine if a predetermined time period such as less than thirty (30) seconds has elapsed since the front side door was opened. If at least thirty (30) seconds has elapsed since the front side door opened, routine 100 times out and proceeds to step 120 to output a wrong chirp audible sound and/or visual flashing light to indicate to the person that the requirements were not met due to the requirement that the event take place in less than thirty (30) seconds, according to one example. Thereafter, routine 100 proceeds to step 114 to wait for the vehicle front side door to close to reset the sequence before returning to step 104. If the events of the routine occur in less than thirty (30) seconds since the front side door was opened, routine 100 proceeds to step 122 to output an audible chirp sound as a signal for the person to move away from the rear door. Next, at decision step 124, routine 100 determines if the person has moved away from the rear door within a predetermined time period such as three (3) seconds and, if so, opens the trunk/hatch rear door with the actuator at step 126. It should be appreciated that if a hand of the person touches the rear window during the opening of the rear door, which causes a spike in the corresponding proximity sensor signal, the trunk/hatch actuation will be reversed to close the rear door. If the person does not move away from the vehicle within three (3) seconds, routine 100 proceeds to decision step 110 to wait for the vehicle front side door to close to reset the sequence before restarting at step 104. Accordingly, the user must exit the vehicle and move toward the back of the vehicle in less than thirty (30) seconds and must pause for one (1) second and then move away from the vehicle when notified within three (3) seconds in order to cause actuation of the rear door trunk/hatch to activate to the open position. Further, a user may stop the opening of the door/hatch by touching their hand on the rear window so as to reverse the opening to a closing position to undue any unintended rear door open activations.

Figure 7:
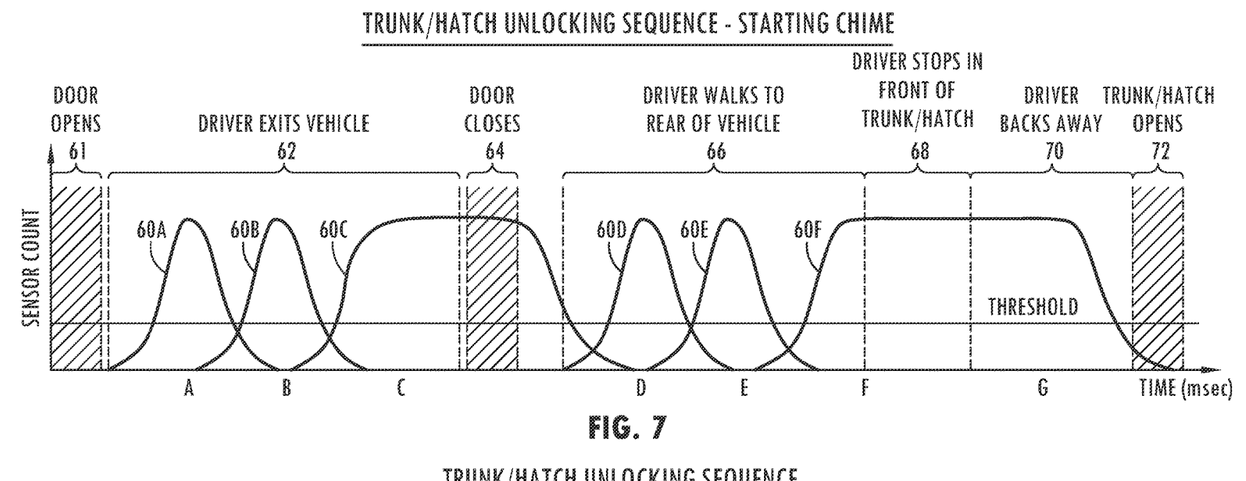
FIG. 7 is a graph illustrating a rear door unlocking sequence for the control system, according to one embodiment.

Referring to FIG. 7, the trunk/hatch unlocking sequence is further illustrated showing the various signals of the proximity sensors during a sequence of event leading to opening of the rear door. In this example, signals 60A-60H correspond to the signals generated by the proximity sensors 30A-30H, respectively. The timing sequence starts with the front side door opening during time period 61 and a driver proceeding to exit the vehicle during time period 62. When this happens, the proximity sensors 30A and 30B detect the driver exiting the vehicle as shown by signals 60A and 60B sequentially increasing in amplitude and dropping down as the driver passes through the activation region and leaves the sensor region. The amplitude of each signal can be compared to a threshold value to determine detection of the person and the signals relative to each other can be processed to determine a direction of movement of the person. The driver then proceeds to move into close proximity to the proximity sensor 30C and closes the front side door at time period 64. The driver then proceeds to move (e.g., walk) towards the rear of the vehicle and staying in close proximity to the vehicle during time period 66. During this time, sensors 30D and 30E generate signals 60D and 60E, respectively, in a sequential manner which detects the movement of the driver moving rearward of the vehicle side door 14A. As the driver approaches the rear of the vehicle, proximity sensors 30E and 30F in the rear windows 16 detect the driver in proximity to the rear end of the vehicle behind the rear door and generate respective signals 60E and 60F. The driver then stops in front of the hatch/trunk at time period 68 during which the rear central proximity sensor 30F generates an output signal 60F at a substantially constant magnitude that shows that the driver has stopped and is not moving. At this point, the control system outputs an audible chirp and/or visual light flashing as a signal to notify the driver to move away from the rear door. During time period 70, the driver backs away from the rear end of the vehicle such that the signal output 60F from the proximity sensor 30F decreases. If this occurs within three (3) seconds, the trunk/hatch is actuated to the open position during time period 72.

Figure 8:
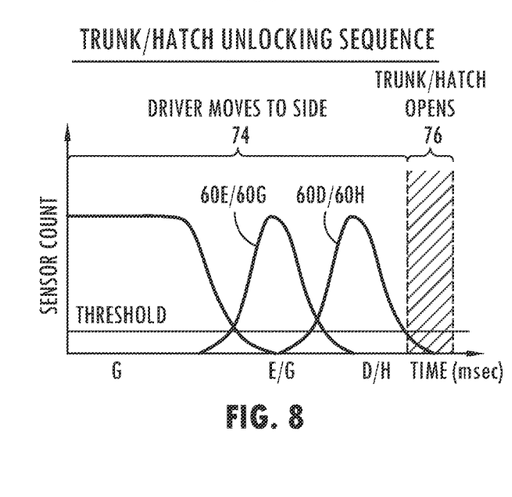
FIG. 8 is a graph illustrating an alternative step in rear door unlocking sequence for the control system, according to another embodiment.

In the above example, the driver of the vehicle moves away from the rear trunk within three (3) seconds as the final step in order to cause actuation of the rear door to the open position. According to another embodiment, the driver of the vehicle may move to a side of the vehicle as shown in FIG. 8. FIG. 8 presumes that the trunk/hatch unlocking sequence is substantially the same as shown in FIG. 7 except that the driver moves to a rear left or rear right side at time period 74 of the vehicle as the final step. The rear side movement is detected by the rear proximity sensors 30E or 30G and rear side proximity sensors 30D and 30H. As such, the driver moves to the side closest to the driver side, sensors 30E and 30D detect that the driver has moved to the rear side corner of the vehicle, whereas sensors 30G and 30H detect that the driver has moved toward the opposite rear corner of the vehicle. When this occurs within the three (3) second time period, the trunk/hatch opens at time period 76.

It should be appreciated that the trunk/hatch unlocking sequence may automatically open the trunk/hatch of the vehicle without requiring additional input from the driver or passenger of the vehicle. It should further be appreciated that the trunk/hatch may be opened based on other timing sequences such as a driver or passenger approaching the vehicle from another direction and/or with possession of a key fob. Further, it should be appreciated that the trunk/hatch may be automatically closed when the proximity sensors detect the driver or passenger walking away from the vehicle. For example, if the driver or passenger is detected in close proximity to the vehicle when the trunk/hatch is in the open position and then subsequently walks away from the vehicle, the trunk/hatch may be actuated to the closed position. It should be appreciated that the proximity sensors 30E-30G located in the rear window 26 are advantageously unobstructed and may sense close proximity to the object both when the trunk/hatch is in the closed position or the open position by sensing in either direction of the glass window.

Accordingly, the vehicle control system and method advantageously controls a vehicle rear door 16 to allow the rear door 16 to open and also close with minimal driver interaction. This enables a driver or passenger of the vehicle to access the trunk or hatch area of the vehicle in a simple and convenient manner without actuating any depressible mechanical switches or other extensive touch inputs or other learned gestures or actions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of controlling a vehicle rear door comprising:
   detecting opening of a side door of a vehicle;
   sensing with a plurality of proximity sensors movement of a person moving along an outer side of the vehicle to a rear of the vehicle; and
   controlling an actuator to open the rear door of the vehicle in response to the detected opening of the side door followed by the sensed movement of the person.

2. The method of claim 1 further comprising the step of detecting the person moving away from the rear of the vehicle, prior to controlling the actuator to open the door.

3. The method of claim 1, wherein the proximity sensors comprise capacitive sensors.

4. The method of claim 3, wherein the capacitive sensors comprise transparent electrodes.

5. The method of claim 3, wherein the plurality of proximity sensors further comprise one or more proximity sensors located on a rear window of the vehicle.

6. The method of claim 1 further comprising the step of detecting the person exiting the vehicle prior to controlling the actuator to open the rear door.

7. The method of claim 1, wherein the rear door comprises one of a hatch and a trunk.

8. The method of claim 1, wherein the step of controlling an actuator comprises activating a motor to open the rear door, and wherein the motor is further actuatable to close the rear door upon detecting the person moving away from a rear proximity sensor.

9. A method of controlling a vehicle rear door comprising:
detecting opening of a side door of a vehicle;
sensing with a plurality of proximity sensors movement of a person moving from a side to a rear of the vehicle; and
controlling an actuator to open the rear door of the vehicle in response to the detected opening of the side door followed by the sensed movement of the person, wherein the proximity sensors comprise a plurality of proximity sensors located on one or more side windows of the vehicle.

10. A control system for a rear door of a vehicle, comprising:
a door sensor for detecting an open state of a side door;
an actuator operatively coupled to the rear door of the vehicle;
a plurality of proximity sensors disposed on a side and rear of the vehicle for detecting movement of a person along an outer side of the vehicle to the rear of the vehicle; and
a controller controlling the actuator to open the rear door responsive to the open state of the door being detected followed by the movement of the person from the outer side to the rear of the vehicle being detected.

11. The control system of claim 10 further comprising a side door sensor for sensing opening of the side door, wherein the controller controls the actuator to open the rear door further based on the detected opening of the side door.

12. The control system of claim 11 further comprising an occupant detection system for detecting the person exiting the vehicle, wherein the controller controls the actuator further based on the person detected exiting the vehicle.

13. The control system of claim 10, wherein the proximity sensor comprises a plurality of proximity sensors located on one or more side windows of the vehicle.

14. The control system of claim 13, wherein the proximity sensors comprise capacitive sensors.

15. The control system of claim 14, wherein the capacitive sensors comprise transparent electrodes.

16. The control system of claim 13, wherein the plurality of proximity sensors further comprises one or more proximity sensors located on a rear window of the vehicle.

17. The method of claim 10, wherein the rear door comprises one of a hatch and a trunk.

18. The method of claim 10, wherein the step of controlling an activation comprises activating a motor to open the rear door wherein the motor is further actuatable to close the rear door open detecting the person moving away from a rear proximity sensor.

19. A vehicle comprising:
a rear door;
a side door;
a door sensor for detecting an open state of the side door;
an actuator for actuating the rear door;
a plurality of proximity sensors disposed on a side and rear of the vehicle for detecting movement of a person from the side to the rear of the vehicle responsive to the detected open state of the side door; and
a controller controlling the actuator to open the rear door when the movement of the person from the side to the rear is detected.

20. The system of claim 19 further comprising an occupant detection sensor for detecting the person exiting the vehicle, wherein the controller actuates the actuator further based on the person detected exiting the vehicle prior to moving from the side of the rear of the vehicle.

* * * * *